United States Patent [19]
Birdwell

[11] Patent Number: 5,409,834
[45] Date of Patent: Apr. 25, 1995

[54] METHOD AND APPARATUS FOR REMOVING POLLUTANTS FROM A SOURCE OF POLLUTED AIR

[76] Inventor: Robert S. Birdwell, 1415 Clover La., Fort Worth, Tex. 76107

[21] Appl. No.: 43,655

[22] Filed: Apr. 6, 1993

[51] Int. Cl.$^6$ .............................................. C12M 1/14
[52] U.S. Cl. ................................... 435/310; 435/311; 435/313
[58] Field of Search ............... 435/262, 262.5, 206, 435/299, 300, 310, 311, 313, 315, 316, 819; 422/120, 122, 123, 124; 55/80, 83, 84, 89, 86, 90, 92, 93, 94, 237, 238, 257.2, 259, DIG. 46; 261/160, 161, 79.1, 79.2, 98, 115, 117, 118; 239/461

[56] References Cited

U.S. PATENT DOCUMENTS

| | | | |
|---|---|---|---|
| 3,233,882 | 2/1966 | Calaceto | 55/238 |
| 3,892,699 | 7/1975 | Weisse | 260/29.6 MM |
| 4,169,049 | 9/1979 | Salkinoja-Salonen | 435/251 |
| 4,421,534 | 12/1983 | Walker | 435/266 |
| 4,544,381 | 10/1985 | Schmidt | 435/266 |
| 4,734,111 | 3/1988 | Hoffmann et al. | 55/98 |
| 4,806,148 | 2/1989 | Ottengraf | 435/266 |
| 4,934,545 | 6/1990 | Pezzoli et al. | 215/250 |
| 4,959,084 | 9/1990 | Wolverton et al. | 55/68 |
| 5,005,345 | 4/1991 | Pinckard et al. | 56/71 |
| 5,064,763 | 11/1991 | Bentz | 435/266 |
| 5,077,025 | 12/1991 | Glass | 435/266 |
| 5,082,475 | 1/1992 | Bentz | 55/68 |

FOREIGN PATENT DOCUMENTS

| | | | |
|---|---|---|---|
| 2643211 | 4/1978 | Germany | 435/266 |
| 4017230 | 12/1991 | Germany | 435/266 |
| 4300621 | 10/1992 | Japan | 422/122 |

OTHER PUBLICATIONS

"Air Pollution Control Costs May Be Reduced With Biofiltration", RMT Network, pp. 5 and 8 Apr. 6, 1993.

Primary Examiner—William H. Beisner
Attorney, Agent, or Firm—Charles D. Gunter, Jr.

[57] ABSTRACT

A method and apparatus are shown for removing pollutants from a source of polluted air. Polluted air is introduced from a supply conduit to a wet plenum chamber. The wet plenum chamber has a spray nozzle arranged to spray a microbial laden liquid from a liquid source into the incoming polluted air. Air is allowed to pass from the wet plenum chamber to a wet fill chamber which contains a filtration medium and which has a spray nozzle arranged to spray a microbial laden liquid onto the filtration medium. The air is allowed to pass from the wet fill chamber through a dry, particulate filter medium and is then exhausted to the atmosphere.

6 Claims, 2 Drawing Sheets

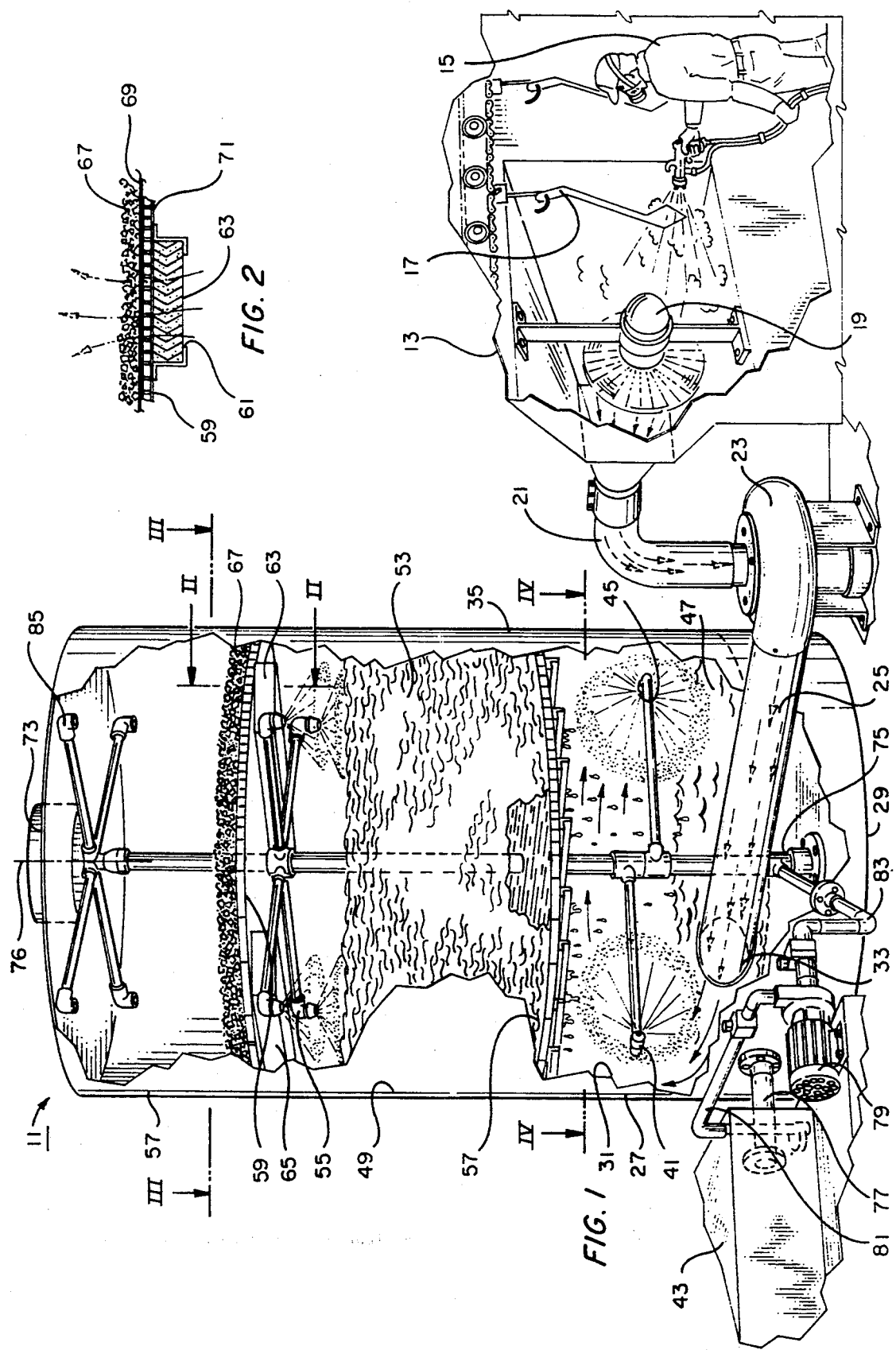

METHOD AND APPARATUS FOR REMOVING POLLUTANTS FROM A SOURCE OF POLLUTED AIR

BACKGROUND OF THE INVENTION

1. Field of the Invention

The present invention relates generally to air pollution control systems and, more specifically, to a biological purification system for polluted air.

2. Description of the Prior Art

The problem of air pollution in modern society has received increased attention in recent years. Air pollution from automobiles, industrial plants, released refrigerants, and the like have created serious environmental problems in the United States and other industrialized countries.

Increasingly stringent air pollution control regulations require the control of volatile organic compounds (VOC's) and toxic agents. However, most air pollution control systems presently available are very expensive to install and operate. In the case of smaller emission sources that emit pollutants at only low concentrations, it is often cost prohibitive to control these types of emissions using conventional technology. A need exists, therefore, for a simple, cost effective apparatus and method for removing pollutants from a source of polluted air in order to control air pollution from industrial operations, furnaces, paint booths, incinerators, and the like.

Biological disposal and purification systems have been known in the past especially in the case of fluid streams, such as waste water treatment. Typical prior art processes, such as that described in U.S. Pat. No. 5,064,763, issued Nov. 12, 1991, to Bentz feed polluted gases through one or more beds of biologically active material such as compost, wood chips, peat, soil, plant residues, or the like. The biologically active material containing the microorganisms is kept moist, as by passing the waste air through a humidifier before entry into the material, usually at the bottom of a filter bed. Pollutants in the gas stream are removed as they pass through the filter bed by diffusion into a wet film covering the filter particles. Biodegradation of the air pollutants takes place in this film. With a sufficient rate of biological activity, the pollutants are removed by aerobic degradation and form harmless byproducts, in the case of non-chlorinated VOC's, water and carbon dioxide. While the biologically active material is kept "moist", the waste gases do not contact a liquid stream, as might be utilized in a traditional "wet scrubbing" operation.

U.S. Pat. No. 4,959,084, issued Sep. 25, 1990, to Wolverton et al., shows a combined air and water pollution control system. The pollution control system includes an exhaust for directing polluted gases out of a furnace and a fluid circulating system which circulates fluid, such as waste water, from a source past the furnace where the fluid flow entrains the pollutants from the furnace. The combined fluid and pollutants are then directed through a rock/plant/microbial filtering system. A suction pump is used to move the treated waste water from the filter system past the exhaust to again entrain more pollutants from the furnace. The system utilizes a venturi which would require a high velocity air stream and consequently excessive horse power requirements. The venturi could, in some instances, also constitute a restriction in the gas flow which would cause undesirable pressure or velocity changes within the system.

It is an object of the present invention to provide a biological air pollution control system which is simple in design and economical to manufacture and which converts air pollutants into harmless and/or odorless forms, thereby preventing such pollutants from entering the atmosphere.

SUMMARY OF THE INVENTION

A method is shown for removing pollutants from a source of polluted air. Polluted air is introduced from a supply conduit to a wet plenum chamber, the wet plenum chamber having at least one spray nozzle arranged to spray a microbial laden liquid from a liquid source into the incoming polluted air. The air is allowed to pass from the wet plenum chamber to a wet fill chamber containing a filtration medium. The wet fill chamber also has at least one spray nozzle arranged to spray a microbial laden liquid onto the filtration medium. The air is then allowed to pass from the wet fill chamber through a dry, particulate filter medium. The air is then exhausted to the atmosphere.

The preferred biofiltration apparatus used to remove pollutants from a source of polluted air includes a wet plenum chamber having a bottom and generally cylindrical sidewalls which together define an initially open interior. A supply conduit is connected at a tangential location to the cylindrical sidewalls of the wet plenum chamber for introducing polluted air in a peripheral path of travel within the wet plenum chamber. The wet plenum chamber has at least one spray nozzle arranged to spray a microbial laden liquid from a liquid source into the incoming polluted air generally normal to the direction of travel thereof. The liquid is allowed to fall to the bottom of the wet plenum chamber to create a liquid level therein. A wet fill chamber is located directly above the wet plenum chamber. The wet fill chamber has cylindrical sidewalls and a bottom grate which also forms a top for the wet plenum chamber. The grate comprises an opening for receiving air passing out of the wet plenum chamber. The wet fill chamber contains a filtration medium which rests upon the grate. The wet fill chamber also has at least one spray nozzle located therein and arranged to spray a liquid laden with microbial agents downwardly onto the filtration medium. The filtration medium is effective to provide an increased dwell time for the air within the wet fill chamber and to provide an increased surface area and thus increased contact between the air and microbial agents. A normally dry plenum chamber is located directed above the wet fill chamber and is separated therefrom by a bulkhead. The bulkhead has at least one opening therein for receiving air passing from the wet fill chamber. A normally dry carbon bed is located above the bulkhead within the dry plenum chamber. The dry carbon bed is effective to remove pollutants from the air which are not readily soluble in the liquid present in the wet plenum chamber and the wet fill chamber. An exhaust opening is provided in the dry plenum chamber for exhausting air so treated to the atmosphere.

Most preferably, the wet plenum chamber, wet fill chamber and dry plenum chamber are all located one above the other and define a generally continuous cylindrical exterior and a central vertical axis. A liquid riser pipe is preferably located within the interior of the apparatus, approximately on the central vertical axis thereof, for supplying water to the wet plenum chamber, the wet fill chamber and, periodically, to the normally dry plenum chamber.

A liquid reservoir is preferably connected by a suitable conduit to the liquid level within the wet plenum chamber. A recirculating pump can be connected by a fluid conduit to the liquid reservoir for pumping liquid from the reservoir to the liquid riser pipe. Preferably, the supply conduit which is connected at a tangential location to the cylindrical sidewalls of the wet plenum chamber is connected to a spray booth in which hydrocarbon polluted air is present. The polluted air is drawn through the supply conduit and introduced into the wet plenum chamber by means of a supply fan located within the supply conduit.

Additional objects, features and advantages will be apparent in the written description which follows.

BRIEF DESCRIPTION OF THE DRAWINGS

FIG. 1 is a simplified, perspective view, partially broken away, of the apparatus for removing pollutants from a source of polluted air of the invention;

FIG. 2 is an isolated, cross-sectional view taken along lines II.—II. in FIG. 1;

in FIG. 1, with portions of the dry carbon, mesh and grate removed for ease of illustration; in FIG. 1 showing the direction of air movement within the wet plenum chamber of the apparatus of the invention.

DETAILED DESCRIPTION OF THE INVENTION

Figure 3:
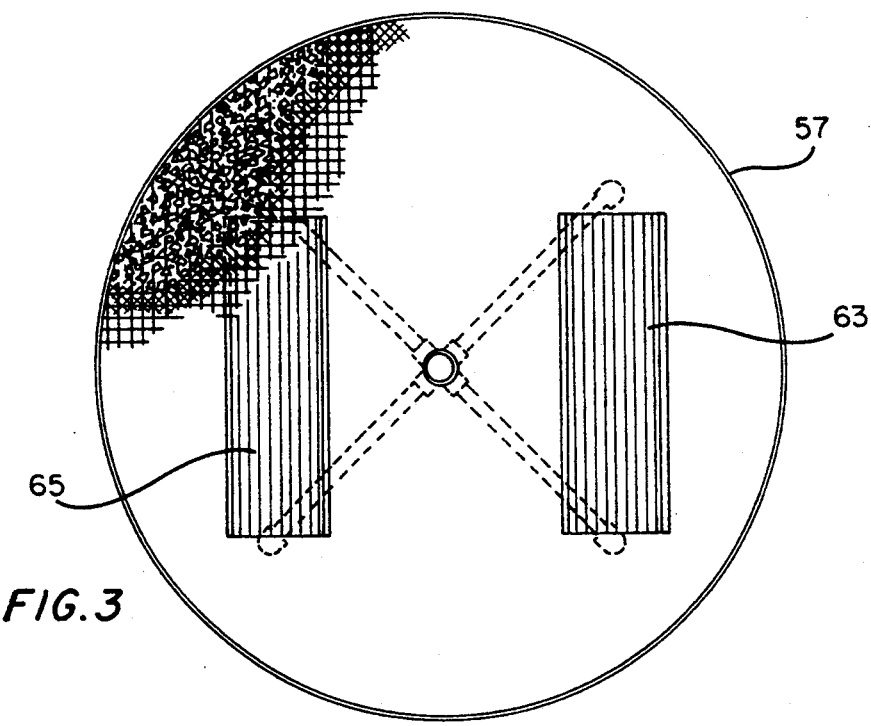
FIG. 3 is a top view, taken along lines III.—III.

FIG. 1 illustrates the biofiltration apparatus of the invention, designated generally as 11. The biofiltration apparatus 11 is used to remove pollutants from a source of polluted air. The term "air" is intended to encompass any gas which, once treated, can be exhausted to the atmosphere. The apparatus and method of the invention are specifically directed toward controlling VOC's, air toxics and odors present in the gas stream to be treated. The toxic constituents of the gas stream can include both inorganic compounds such as $H_2S$ and HCN as well as a variety of organic compounds, for example hydrocarbons. The term "hydrocarbons" is intended to encompass, for example, alkanes or cycloalkanes having 1 to 12 carbon atoms or aromatic compounds, aldehydes, ketones, ethers, carboxylic esters, alcohols, nitro or amino compounds, and the like. Illustrative examples include, but are not limited to, butane, pentane, heptane, octane, methylene chloride, benzene, toluene, phenol, xylene, chlorobenzene, dichlorobenzene, acetone, methanol, ethanol, propanol, isopropanol, butanol, dimethylformamide, acetonitrile, acrylonitrile, acrylic esters, or mixtures thereof.

The particular system illustrated in FIG. 1 includes a spray booth 13 in which a worker 15 sprays paint upon a workpiece 17 to be refinished. The polluted air stream, containing a variety of volatile organic constituents is moved by means of an exhaust fan 19 through an exhaust conduit 21. The gases present in the exhaust conduit 21 are moved in the direction of the exhaust filtration apparatus 11 by means of an in-line blower unit 23 which is connected to a supply conduit 25.

The apparatus 11 includes a wet plenum chamber 27 which has a bottom 29 and generally cylindrical sidewalls which together define an initially open interior 31.

Figure 4:
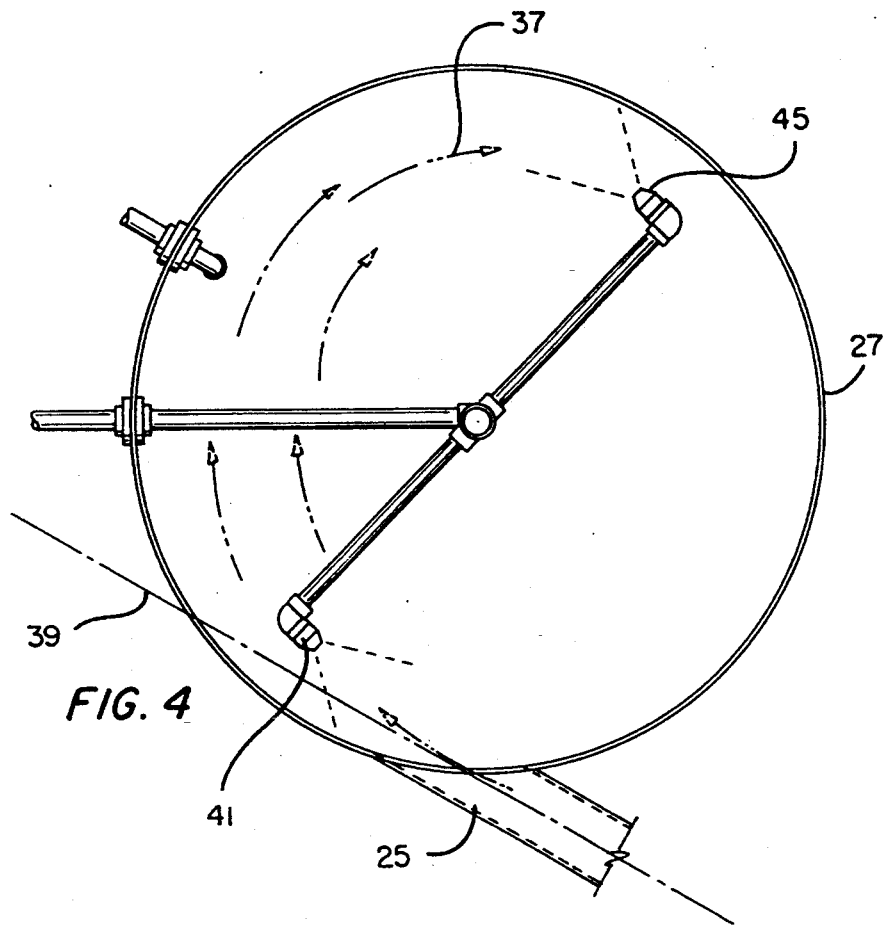
FIG. 4 is a top view, taken along lines IV.—IV.

The supply conduit 25 is connected at a tangential location 33 to the cylindrical sidewalls 35. As shown in FIG. 4, the tangential location of the supply conduit 25 introduces polluted air in a peripheral path of travel (indicated by arrows 37 in FIG. 4) within the wet plenum chamber 27. By "tangential" is meant that the supply conduit 25, while penetrating the cylindrical sidewalls 35 along an axis indicated at 39 in FIG. 4 does not directly intersect the cylindrical sidewalls generally normal thereto. By "peripheral" path of travel is meant travel in a boundary line generally along the outer area of a rounded figure, in this case the open interior of the wet plenum chamber 27.

As shown in FIGS. 1 and 4, the wet plenum chamber 27 has at least one spray nozzle 41 arranged to spray a microbial laden liquid from a liquid source, such as reservoir 43, into the incoming polluted air generally normal to the direction of travel thereof. In the embodiment shown in FIG. 1, the inlet spray arrangement includes a two nozzle system 41, 45 arranged to inject a full spray pattern into the incoming air stream, for example at a flow rate of approximately 37 gallons per minute. This spray arrangement allows for efficient cooling of the incoming air stream in the event that the air stream is above the optimum temperature for the microbial agents present in the liquid spray. Generally speaking, the incoming gas stream should be maintained in a temperature range of about 50°–120° F. Off gases from a paint spray booth would typically have temperatures which would exceed the optimum temperature for microbial agents during bake cycles. The particular arrangement of the nozzles 41, 45, offset approximately 180° within the open interior 31 above the liquid level 47 also creates a "vortex" action within the wet plenum chamber 27 thereby creating the maximum air/water interface within the chamber.

As shown in FIG. 1, the liquid exiting the spray nozzles 41, 45 is allowed to fall to the bottom 29 of the wet plenum chamber 27 to thereby create a liquid level 47 therein. The microbial agents utilized can be obtained from a variety of commercial sources and will vary, depending upon the pollutant being treated. Such microbial agents will generally include indigenous biologically active organisms such as those found in compost, municipal waste or other organic materials and may or may not be catalyzed by additional ingredients.

One typical commercially available product consists of three non-toxic components: the microbial culture; a bio-catalyst; and inorganic nutrients. The microbial culture is comprised of approximately 100 species of naturally occurring (nongenetically altered) bacteria. Each has a job to perform, either as the direct consumers of the hydrocarbons or as support organisms to keep the environment safe for the total population.

The bio-catalyst is a highly oxygen active liquid which provides metabolic oxygen for the microbes in an anaerobic environment. The nutrients can be, for example, high nitrogen content fertilizer. Products of the above type have been approved by the United States Environmental Protection Agency and have been proven to be non-toxic in laboratory tests using a variety of laboratory animals.

The microbial agents act to consume benzene, ethyl benzene, toluene, and xylene components, and methyl ethyl ketones, as well as most other VOC's within the allowable residence time of the gases being treated within the apparatus. From the consumption process, the microbes produce carbon dioxide and carboxylic acid, a fatty acid protein. These proteins then quickly degrade to water and nutrient substances, which facilitates the growth of the microbial population. The ultimate products from the process are $CO_2$ and $H_2O$, and additional microbial cells.

In the embodiment of FIG. 1, the apparatus 11 has a wet fill chamber 49 which is located directly above the wet plenum chamber 27. The wet fill chamber has cylindrical sidewalls and a bottom grate 51 which also forms a top for the wet plenum chamber. The grate 51 comprises an opening for receiving air passing out of the wet plenum chamber. The wet fill chamber contains a filtration medium 53 which rests upon the grate. The filtration medium is any medium which is effective to provide an increased dwell time for the air entering the wet fill chamber and to provide an increased surface area and thus increased contact time between the air and microbial agents present in the system. Such filtration mediums can include, for example, ceramic balls or spheres, ceramic U-shaped elements, corrugated medium, fibrons medium and the like. While such materials have been used in the past in wet scrubbing applications, they differ from the typical support materials used in conventional biofilter applications such as compost, peat, soil, wood chips, plant residues, tree bark, heather, fir or brush wood.

The wet fill chamber 49 also has at least one spray nozzle 55 which is arranged to spray a liquid laden with microbial agents downwardly onto the filtration medium 53. In the example shown in FIG. 1, four spray nozzle heads are provided in order to provide full coverage of the filtration medium.

A normally dry plenum chamber 57 is located directly above the wet fill chamber 49 and is separated therefrom by a solid bulkhead 59. The bulkhead 59 has at least one opening 61 (FIG. 2) for receiving air passing from the wet fill chamber. Preferably, the opening 61 comprises a housing for one of two identical, rectangular shaped demist elements 63, 65 (FIG. 3) which dry the air entering the dry plenum chamber from the wet fill chamber.

A normally dry particulate medium 67 is provided within the dry plenum chamber 57 which is effective to remove pollutants from the air which are not readily soluble in the liquid present in the wet plenum chamber and the wet fill chamber. A variety of suitable particulate mediums can be employed, such as activated carbon or charcoal. As shown in FIG. 2, the carbon particles 67 rest upon a mesh screen 69 which, in turn, is elevated above the bulkhead 59 by means of a grate 71. An exhaust opening 73 is provided in the dry plenum chamber 57 for exhausting the air so treated to the atmosphere.

In the embodiment of the invention illustrated in FIG. 1, the wet plenum chamber 27, the wet fill chamber 49 and the normally dry plenum chamber 57 are all located one above the other and define a generally continuous cylindrical exterior and a central vertical axis 75. However, it will be understood, that the three stages of treatment for the polluted air could be arranged horizontally or in segmented fashion. In the preferred embodiment of FIG. 1, a liquid riser pipe 75 is located within the interior of the apparatus and approximately aligned with the central vertical axis 76 thereof for supplying water to the wet plenum chamber 27, the wet fill chamber 49 and, periodically, to the normally dry plenum chamber 57. The liquid reservoir 43 is connected by a suitable conduit 77 to the liquid level 47 within the wet plenum chamber 27. A recirculating pump 79 is connected by a fluid conduit 81 to the reservoir 43 and by a conduit 83 to the riser pipe 75 for pumping liquid from the reservoir to the liquid riser pipe.

The following example is intended to be illustrative of the invention without being limiting:

In a particularly preferred embodiment of the apparatus, the cylindrical unit is sized to a 10 foot diameter by 16 foot height and is designed to handle a 10,000 CFM air stream containing hydrocarbon pollutants. The inlet opening to the unit is approximately 24 inches in diameter. The total water capacity of the unit is 2,500 gallons. This is achieved with a 24 inch water level 47 within the wet plenum chamber 27 for the 10 foot diameter apparatus and by means of the auxiliary reservoir 43. The main water riser pipe 75 is supplied with water from the high volume pump 79 and moves the water to the spray nozzles 41, 45 at the air inlet to the wet plenum chamber 27 and supplies water downwardly through the spray nozzles 25 above the wet fill chamber 49.

The two nozzle spray system present in the wet plenum chamber 27 injects a full spray pattern into the incoming air stream at a rate of approximately 37 gallons per minute for each nozzle. In the case of the 10 foot diameter apparatus having a water level 47 within the wet plenum chamber 27, the 37 gpm spray nozzles 41, 45 are located approximately 2 feet above the water level 47 (4 feet above the bottom 29) to thereby allow microbial laden liquid to be sprayed across the upper exposed surface of the liquid level 47 of the wet plenum chamber to thereby create a vortex action within the liquid level. The wet plenum chamber 27 allows incoming air to slowly circulate, be reduced in velocity and enter the wet fill chamber 49 evenly across the cross-sectional area of the grate 51. If desired, baffles can be placed within the wet plenum chamber to facilitate the even distribution of air into the fill chamber to prevent channeling or hot spots.

The wet fill chamber 49 is wet by the four nozzle spray system 55 providing full coverage with approximately 328 gallons per minute of water being supplied through the nozzles 55 to fully saturate the wet fill medium. The carbon bed 67 operates dry in the present design with mist eliminators 63 being located under the carbon bed to dry the air stream before it enters the carbon bed. In the example shown, a 3 inch thick bed of carbon is supported above the bulkhead 59. The dry upper plenum space allows a low volume distribution system (nozzles 85) to provide full coverage of water to the carbon bed in order to periodically regenerate the carbon bed. In the example shown, full water coverage is provided at a 60 gallon per minute rate. The treated air stream exits a 3 foot diameter opening 73 and is ducted out of any surrounding building to the atmosphere. The high volume pump 79 is preferably a 500 gallon per minute, 10 horsepower pump. The blower 23 is preferably capable of 5,000 to 10,000 cubic foot per minute flow.

An invention has been provided with several advantages. The apparatus and method of the invention provide a safe and economical means for treating air contaminated with odors and/or noxious or toxic chemicals. The three stage treatment process removes both those pollutants which are easily soluble in the liquid containing microbial agents and those pollutants which are only slightly soluble in the liquid medium. The apparatus is simple in design and economical to manufacture.

While the invention has been shown in only one of its forms, it is not thus limited but is susceptible to various changes and modifications without departing from the spirit thereof.

What is claimed is:

1. A biofiltration apparatus for removing pollutants from a source of polluted air, comprising:

a wet plenum chamber having a bottom and generally cylindrical sidewalls which together define an initially open interior, the wet plenum chamber having a liquid level therein;

a supply conduit connected at a tangential location to the cylindrical sidewalls of the wet plenum chamber for introducing polluted air in a peripheral path of travel within the wet plenum chamber, the wet plenum chamber having at least one internal spray nozzle located within the initially open interior and arranged to spray a microbial laden liquid from a liquid source into the incoming polluted air generally normal to the direction of travel thereof;

a wet fill chamber having an opening for receiving air passing out of the wet plenum chamber, the wet fill chamber containing a filtration medium, the wet fill chamber also having at least one spray nozzle located therein and arranged to spray a liquid laden with microbial agents onto the filtration medium, the filtration medium being effective to provide an increased dwell time for the air within the wet fill chamber and to provide an increased surface area and thus increased contact between the air and microbial agents;

a normally dry plenum chamber having a dry carbon filter bed contained therein, the dry plenum chamber having at least one opening for receiving air passing from the wet fill chamber, the dry carbon being effective to remove pollutants from the air which are not readily soluble in the liquid present in the wet plenum chamber and the wet fill chamber; an exhaust opening for exhausting the air so treated to the atmosphere; and wherein the at least one internal spray nozzle provided in the wet plenum chamber is located above the liquid level a preselected distance which is selected to allow microbial laden liquid to be sprayed across an upper surface of the liquid level of the wet plenum chamber to thereby create a vortex action within the liquid level.

2. A biofiltration apparatus for removing pollutants from a source of polluted air, comprising:

a wet plenum chamber having a bottom and generally cylindrical sidewalls which together define an initially open interior, the wet plenum chamber having a liquid level therein;

a supply conduit connected at a tangential location to the cylindrical sidewalls of the wet plenum chamber for introducing polluted air in a peripheral path of travel within the wet plenum chamber, the wet plenum chamber having at least one internal spray nozzle located within the initially open interior and arranged to spray a microbial laden liquid from a liquid source into the incoming polluted air generally normal to the direction of travel thereof, the liquid being allowed to fall to the bottom of the wet plenum chamber to thereby create said liquid level therein;

a wet fill chamber located directly above the wet plenum chamber, the wet fill chamber having cylindrical sidewalls and a bottom grate which also forms a top for the wet plenum chamber, the grate comprising an opening for receiving air passing out of the wet plenum chamber, the wet fill chamber containing a filtration medium which rests upon the grate, the wet fill chamber also having at least one spray nozzle located therein and arranged to spray a liquid laden with microbial agents downwardly onto the filtration medium, the filtration medium being effective to provide an increased dwell time for the air within the wet fill chamber and to provide an increased surface area and thus increased contact between the air and microbial agents;

a normally dry plenum chamber located directly above the wet fill chamber and separated therefrom by a bulkhead, the bulkhead having at least one opening therein for receiving air passing from the wet fill chamber;

a normally dry carbon bed located above the bulkhead within the dry plenum chamber, the dry carbon bed being effective to remove pollutants from the air which are not readily soluble in the liquid present in the wet plenum chamber and the wet fill chamber;

an exhaust opening in the dry plenum chamber for exhausting the air so treated to the atmosphere; and wherein said at least one internal spray nozzle in the wet plenum chamber comprises a pair of spray nozzles being offset 180° apart, the nozzles being located above the liquid level a preselected distance which is effective to create a vortex action within the liquid level of the wet plenum chamber.

3. The apparatus of claim 2, further comprising:

a demist element located within the opening to the normally dry plenum chamber for drying the air entering the dry plenum chamber from the wet fill chamber.

4. The apparatus of claim 2, wherein the wet plenum chamber, wet fill chamber and dry plenum chamber are all located one above the other and define a generally continuous cylindrical exterior and a central vertical axis, and wherein a liquid riser pipe is located within the interior of the apparatus approximately on the central vertical axis thereof the liquid riser pipe being connected between the fluid source, the pair of spray nozzles of the wet plenum chamber and the at least one spray nozzle of the wet fill chamber for supplying liquid to the wet plenum chamber and the wet fill chamber.

5. The apparatus of claim 4, further comprising:

a liquid reservoir connected by a suitable conduit to the liquid level within the wet plenum chamber and a recirculating pump connected by a fluid conduit to the liquid reservoir for pumping liquid from the reservoir to the liquid riser pipe.

6. The apparatus of claim 2, wherein the supply conduit which is connected at a tangential location to the cylindrical sidewalls of the wet plenum chamber is connected to a spray booth in which hydrocarbon polluted air is present, the polluted air being drawn through the supply conduit and introduced into the wet plenum chamber by means of a supply fan located within the supply conduit.

* * * * *